(12) United States Patent
Taira

(10) Patent No.: US 11,060,773 B2
(45) Date of Patent: Jul. 13, 2021

(54) REFRIGERATING DEVICE

(71) Applicant: DAIKIN INDUSTRIES, LTD., Osaka (JP)

(72) Inventor: Shigeharu Taira, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/736,431

(22) PCT Filed: Jul. 28, 2016

(86) PCT No.: PCT/JP2016/072230
§ 371 (c)(1),
(2) Date: Dec. 14, 2017

(87) PCT Pub. No.: WO2017/018494
PCT Pub. Date: Feb. 2, 2017

(65) Prior Publication Data
US 2018/0172329 A1    Jun. 21, 2018

(30) Foreign Application Priority Data

Jul. 30, 2015    (JP) .............................. JP2015-150707

(51) Int. Cl.
| F25B 45/00 | (2006.01) |
| F25B 49/02 | (2006.01) |
| F25B 13/00 | (2006.01) |
| B60H 1/00 | (2006.01) |

(52) U.S. Cl.
CPC .............. *F25B 45/00* (2013.01); *F25B 13/00* (2013.01); *F25B 49/02* (2013.01);
(Continued)

(58) Field of Classification Search
CPC .............. F25B 2400/16; F25B 2400/24; F25B 43/006; F25B 45/00; F25B 13/00;
(Continued)

(56) References Cited

U.S. PATENT DOCUMENTS 4,480,446 A * 11/1984 Margulefsky ........... F25B 45/00
                                                          62/292
4,803,843 A *  2/1989 Otto .................... G01N 33/0013
                                                          62/127
(Continued)

FOREIGN PATENT DOCUMENTS

CN        1401068 A     3/2003
EP    2 960 598 A1    12/2015
(Continued)

OTHER PUBLICATIONS

International Search Report for PCT/JP2016/072230 (PCT/ISA/210) dated Oct. 4, 2016.
(Continued)

*Primary Examiner* — Tavia Sullens
(74) *Attorney, Agent, or Firm* — Birch, Stewart, Kolasch & Birch, LLP.

(57) ABSTRACT

A refrigerating device includes a refrigerant circuit through which a refrigerant flows. A refrigerant collection container through which the refrigerant flows in a refrigeration cycle operation is detachably provided in the refrigerant circuit.

16 Claims, 6 Drawing Sheets

(52) U.S. Cl.
CPC .. *B60H 1/00007* (2013.01); *F25B 2313/0233* (2013.01); *F25B 2313/02741* (2013.01); *F25B 2313/0314* (2013.01); *F25B 2345/001* (2013.01); *F25B 2345/002* (2013.01); *F25B 2345/006* (2013.01)

(58) Field of Classification Search
CPC .............. F25B 49/02; F25B 2313/0233; F25B 2313/02741; F25B 2313/0314; F25B 2345/002; F25B 2345/006; F25B 2345/0052
See application file for complete search history.

(56) References Cited

U.S. PATENT DOCUMENTS

| | | | | |
|---|---|---|---|---|
| 5,377,496 A | * | 1/1995 | Otto | G01N 31/221 116/206 |
| 6,725,677 B2 | * | 4/2004 | Taira | F25B 49/005 62/127 |
| 6,971,246 B2 | * | 12/2005 | Kurata | B60H 1/00328 62/196.4 |
| 2003/0010044 A1 | | 1/2003 | Taira | |

FOREIGN PATENT DOCUMENTS

| | | |
|---|---|---|
| JP | 07-146037 A | 6/1993 |
| JP | 07-146037 A | 6/1995 |
| JP | 07-310962 A | 11/1995 |
| JP | 2005-221231 A | 8/2005 |
| JP | 2010-002101 A | 1/2010 |
| JP | 2013-217594 A | 10/2013 |
| JP | 2015-004473 A | 1/2015 |
| WO | WO 2012/137260 A1 | 10/2012 |

OTHER PUBLICATIONS

Extended European Search Report dated Mar. 14, 2019 for corresponding European Application No. 16830599.3.

* cited by examiner

REFRIGERATING DEVICE

TECHNICAL FIELD

The present invention relates to a refrigerating device such as an air conditioning machine, a chiller, or the like, for instance.

BACKGROUND ART

As an example of refrigerating devices, a multiple-type air conditioning machine is conventionally disclosed in JP 2015-4473 A (PTL 1). The multiple-type air conditioning machine includes one outdoor unit and a plurality of indoor units connected to the one outdoor unit through branch pipes.

The outdoor unit includes a compressor that compresses a refrigerant. Flow of the refrigerant compressed by the compressor is controlled by a four-way switching valve. In a cooling operation, more specifically, the refrigerant is delivered from the compressor to an outdoor heat exchanger in the outdoor unit and the outdoor heat exchanger functions as a condenser. In a heating operation, the refrigerant is delivered from the compressor to an indoor heat exchanger in each indoor unit and the indoor heat exchanger functions as a condenser.

Thus the outdoor heat exchanger and the indoor heat exchangers form portions of a refrigerant circuit through which the refrigerant flows.

CITATION LIST

Patent Literature

PTL1: JP 2015-4473 A

SUMMARY OF INVENTION

Technical Problem

When the multiple-type air conditioning machine is disposed of, it is desirable to collect, regenerate, and reuse the refrigerant in the refrigerant circuit in order to reduce wastes and to effectively utilize resources. For collection of the refrigerant, initially, the refrigerant in the refrigerant circuit is gathered into the outdoor heat exchanger by a pump down operation. After that, a refrigerant collection cylinder is connected to a service port on a side of the outdoor unit in the refrigerant circuit and the refrigerant in the outdoor heat exchanger is collected into the refrigerant collection cylinder. Accordingly, an operator who collects the refrigerant (hereinbelow, simply referred to as "operator") has to bring the refrigerant collection cylinder to a place where the multiple-type air conditioning machine is installed.

The refrigerant circuit in the multiple-type air conditioning machine is filled with a greater amount of refrigerant than a refrigerant circuit in a pair-type air conditioning machine that includes one outdoor unit and one indoor unit. Accordingly, the refrigerant collection cylinder that is used for collection of the refrigerant in the multiple-type air conditioning machine is larger and heavier than a refrigerant collection cylinder that is used for collection of a refrigerant in the pair-type air conditioning machine. Specifically, the refrigerant collection cylinder having a weight exceeding 20 kg may be used depending on a configuration of the multiple-type air conditioning machine.

Therefore, a problem is caused in that an operation for collecting the refrigerant in the multiple-type air conditioning machine brings about an especially great load.

An object of the invention is, therefore, to provide a refrigerating device by which the load of the operation for collecting the refrigerant can be reduced.

Solution to Problem

In order to solve the problem, a refrigerating device in accordance with the invention comprises a refrigerant circuit through which a refrigerant flows, wherein a refrigerant collection container through which the refrigerant flows in a refrigeration cycle operation is detachably provided in the refrigerant circuit.

According to an above configuration, when the refrigerant is collected from the refrigerant circuit, the refrigerant in the refrigerant circuit is collected into the refrigerant collection container and the refrigerant collection container is thereafter detached from the refrigerant circuit. Thus the operator may avoid bringing a refrigerant collection cylinder, for instance, to a place where the refrigerant circuit exists. As a result, the load of the operation for collecting the refrigerant can be reduced.

In an embodiment, the refrigerating device further comprises an outdoor unit including an outdoor heat exchanger provided in the refrigerant circuit, wherein the refrigerant collection container is provided in the outdoor unit.

According to the embodiment, in which the refrigerant collection container is provided in the outdoor unit, deterioration in appearance can be avoided and the refrigerant collection container can be protected from impact from outside.

In an embodiment, indoor heat exchangers are provided in the refrigerant circuit, and wherein the outdoor heat exchanger is a heat exchanger in which flattened tubes are used as heat transfer tubes.

According to the embodiment, use of the flattened tubes as the heat transfer tubes makes a capacity of the outdoor heat exchanger equal to or smaller than a capacity of each of the indoor heat exchangers and thus allows the outdoor heat exchanger to be reduced in size. As a result, a vacant space in the outdoor unit can be increased. Accordingly, the refrigerant collection container can be increased in size without increase in a size of the outdoor unit.

In an embodiment, the refrigerating device further comprises an outdoor unit including an outdoor heat exchanger provided in the refrigerant circuit, wherein the refrigerant collection container is provided out of the outdoor unit.

According to the embodiment, in which the refrigerant collection container is provided out of the outdoor unit, the operator is enabled to easily carry out operations for detaching and attaching the refrigerant collection container.

In an embodiment, the refrigerating device further comprises a plurality of indoor units including indoor heat exchangers provided in the refrigerant circuit.

According to the embodiment, the refrigerant circuit is filled with all the greater amount of refrigerant for existence of the plurality of indoor units. Therefore, a significant benefit is attained by collection of the refrigerant.

In an embodiment,
the refrigerant collection container includes
a container body that retains the refrigerant, and
first and second stop valves that are provided in the refrigerant circuit with the container body between.

According to the embodiment, after the refrigerant collection container is detached from the refrigerant circuit, the refrigerant in the container body can be easily and reliably prevented from leaking out by the first and second stop valves.

In an embodiment,
the refrigerant collection container is a receiver.

According to the embodiment, in which the refrigerant collection container is the receiver, increase in costs of manufacture can be curbed.

Advantageous Effects of Invention

In the refrigerating device in accordance with the invention, the load of the operation for collecting the refrigerant can be reduced by the refrigerant collection container.

DESCRIPTION OF EMBODIMENTS

Figure 1:
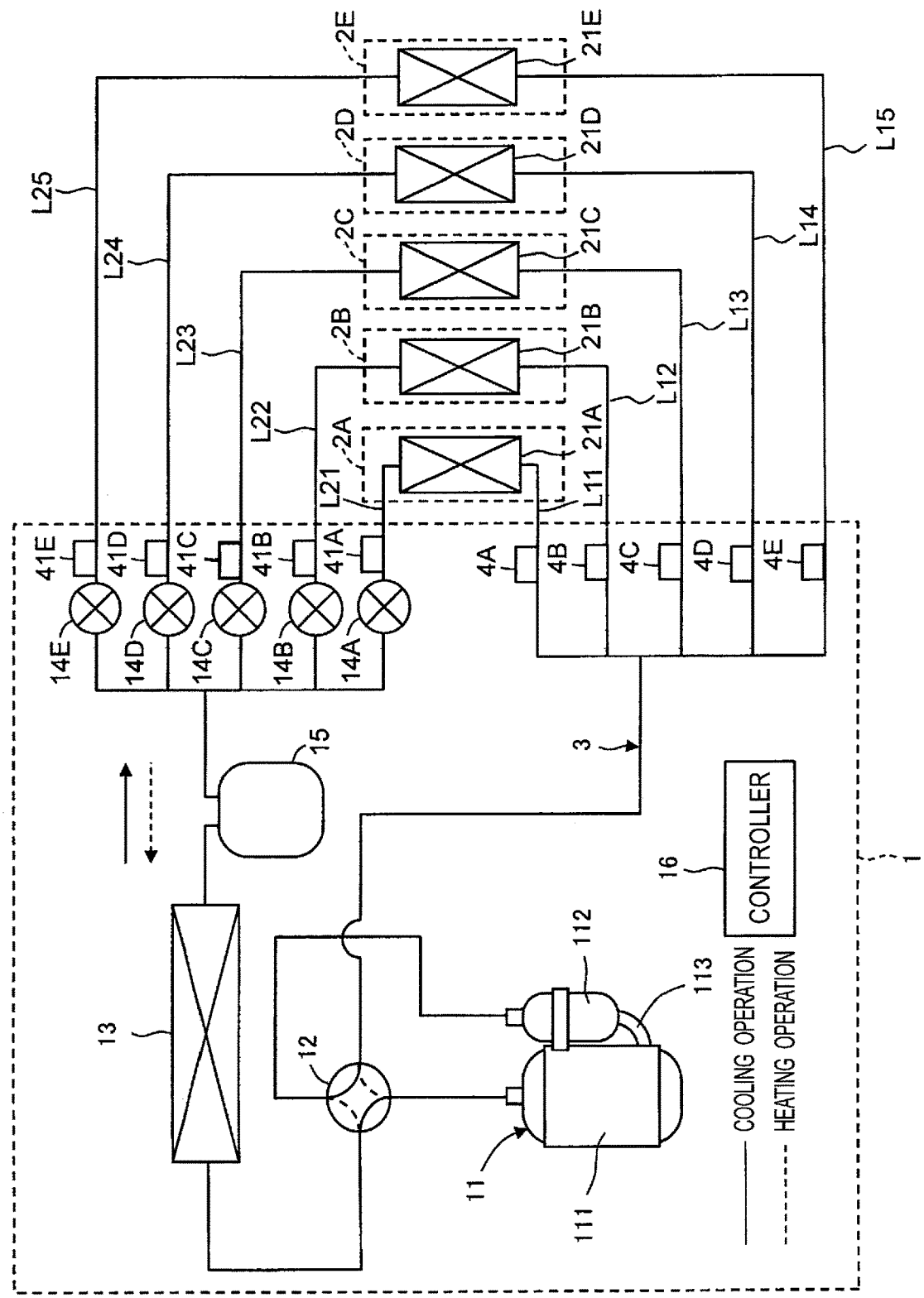
FIG. 1 is a circuit diagram illustrating a multiple-type air conditioning machine in accordance with a first embodiment of the invention.

Hereinbelow, the invention will be described in detail with reference to embodiments illustrated in the drawings.

First Embodiment

FIG. 1 is a circuit diagram illustrating a multiple-type air conditioning machine in accordance with a first embodiment of the invention.

The air conditioning machine includes one outdoor unit 1, a plurality of indoor units 2A, 2B, 2C, 2D, and 2E, and a refrigerant circuit 3 through which a refrigerant flows. R22 refrigerant is used as the refrigerant, for instance. As an example of the refrigerant, mixed refrigerants, such as R410A refrigerant, containing R32, R32 single refrigerant, a low-GWP (Global Warming Potential) refrigerant, or the like may be used.

The outdoor unit 1 includes a compressor 11, a four-way switching valve 12 of which one end is connected to a discharge side of the compressor 11, an outdoor heat exchanger 13 of which one end is connected to another end of the four-way switching valve 12, expansion valves 14A, 14B, 14C, 14D, and 14E that expand the refrigerant, a receiver 15 as an example of the refrigerant collection container, and a controller 16. An outdoor blower fan (not illustrated) that blows air to the outdoor heat exchanger 13 is provided in the outdoor unit 1.

The indoor units 2A, 2B, 2C, 2D, and 2E respectively include indoor heat exchangers 21A, 21B, 21C, 21D, and 21E. The indoor heat exchangers 21A, 21B, 21C, 21D, and 21E are provided in the refrigerant circuit 3 and form principal parts on an indoor side of the refrigerant circuit 3. Indoor blower fans (not illustrated) that blow air to the indoor heat exchangers 21A, 21B, 21C, 21D, and 21E are provided in the indoor units 2A, 2B, 2C, 2D, and 2E, respectively. The indoor units 2A, 2B, 2C, 2D, and 2E may be of wall-hanging type or may be of ceiling-embedded type. On condition that the indoor units 2A, 2B, 2C, 2D, and 2E are of the ceiling-embedded type, cool air or warm air from the indoor units 2A, 2B, 2C, 2D, and 2E may be directly supplied into rooms or may be supplied through ducts into the rooms.

The indoor heat exchangers 21A, 21B, 21C, 21D, and 21E are cross fin type heat exchangers and each primarily include heat transfer fins and a heat transfer tube that are not illustrated.

The heat transfer fins are flat thin plates made of aluminum. A plurality of through-holes are formed on each of the heat transfer fins.

The heat transfer tube includes right circular tubes that are inserted into the through-holes of the heat transfer fins and U-tubes that connect end parts of adjoining right circular tubes.

The compressor 11 includes a compressor body 111 that houses a motor (not illustrated) and the like, on a discharge side, and an accumulator 112, on a suction side. Along with the four-way switching valve 12, the outdoor heat exchanger 13, the expansion valves 14A, 14B, 14C, 14D, and 14E, and the receiver 15, the compressor 11 forms a principal part on an outdoor side of the refrigerant circuit 3. The compressor body 111 may be of any of rotary type, swing type, scroll type, and the like.

Figure 9:
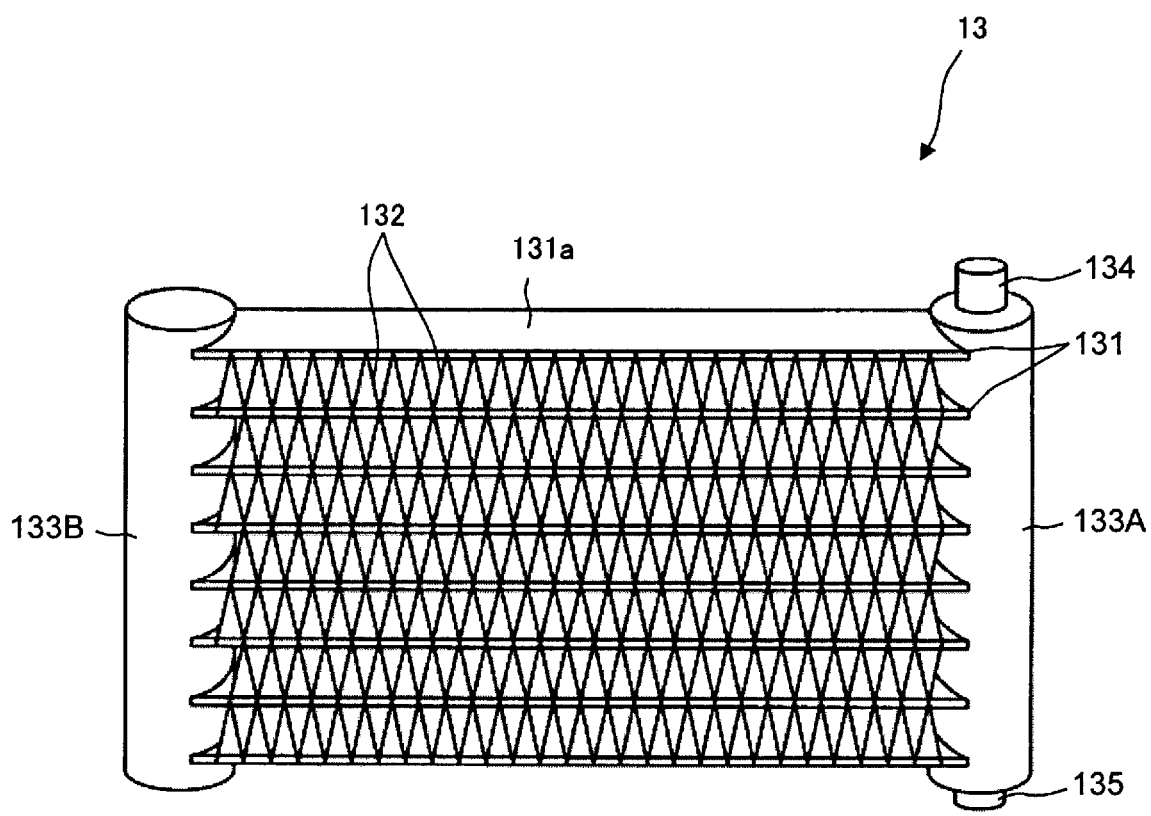
FIG. 9 is an external perspective view of an outdoor heat exchanger in accordance with the first embodiment of the invention.

As illustrated in FIG. 9, the outdoor heat exchanger 13 is a heat exchanger in which flattened tubes 131 are used as heat transfer tubes. More specifically, the outdoor heat exchanger 13 is a stacked heat exchanger and primarily includes the flattened tubes 131, corrugated fins 132, and first and second headers 133A and 133B.

The flattened tubes 131 are formed of aluminum or aluminum alloy and each include a planar part 131*a* which forms heat transfer surfaces and a plurality of inner channels (not illustrated) through which the refrigerant flows. The flattened tubes 131 are arranged at a plurality of levels so as to be stacked with intervals (ventilation spaces) therebetween in a state in which the planar parts 131*a* face upward and downward.

The corrugated fins 132 are fins bent into corrugated shapes and made of aluminum or aluminum alloy. The corrugated fins 132 are placed in the ventilation spaces between the flattened tubes 131 that vertically adjoin and have valley parts and peak parts in contact with the planar parts 131*a* of the flattened tubes 131. The valley parts and the peak parts are joined to the planar parts 131*a* by brazing or the like.

The first and second headers 133A and 133B are connected to both ends of the flattened tubes 131 that are arranged vertically at the plurality of levels. The first and second headers 133A and 133B have a function of supporting the flattened tubes 131, a function of guiding the refrigerant into the inner channels in the flattened tubes 131, and a function of aggregating the refrigerant that comes out of the inner channels.

When the outdoor heat exchanger 13 functions as a condenser for the refrigerant, the refrigerant that flows in through a first opening 134 of the first header 133A is distributed evenly in general into the inner channels in the uppermost flattened tube 131 and flows toward the second header 133B. The refrigerant that reaches the second header 133B is distributed evenly into the inner channels in the second-level flattened tube 131 and flows toward the first header 133A. Subsequently, the refrigerant in the flattened tubes 131 at odd-numbered levels flows toward the second header 133B and the refrigerant in the flattened tubes 131 at even-numbered levels flows toward the first header 133A. The refrigerant in the flattened tube 131 at a lowermost and even-numbered level flows toward the first header 133A, aggregates in the first header 133A, and flows out through a second opening 135 of the first header 133A.

When the outdoor heat exchanger 13 functions as the condenser for the refrigerant, the refrigerant that flows in the flattened tubes 131 radiates heat through the corrugated fins 132 into air flow that flows through the ventilation spaces.

When the outdoor heat exchanger 13 functions as an evaporator for the refrigerant, by contrast, the refrigerant flows in through the second opening 135 of the first header 133A, flows through the flattened tubes 131 and the first and second headers 133A and 133B in a direction opposite to a direction for a function as the condenser for the refrigerant, and thereafter flows out through the first opening 134 of the first header 133A.

When the outdoor heat exchanger 13 functions as the evaporator for the refrigerant, the refrigerant that flows in the flattened tubes 131 absorbs heat through the corrugated fins 132 from the air flow that flows through the ventilation spaces.

One end of the accumulator 112 is connected through a connecting tube 113 to the compressor body 111. That is, inside of the accumulator 112 communicates through the connecting tube 113 with inside of the compressor body 111.

The other end of the accumulator 112 is connected through the four-way switching valve 12 to one end of each of the indoor heat exchangers 21A, 21B, 21C, 21D, and 21E. Interconnecting pipes L11, L12, L13, L14, and L15 guide the refrigerant between the four-way switching valve 12 and the indoor heat exchangers 21A, 21B, 21C, 21D, and 21E, respectively.

Temperature sensors 4A, 4B, 4C, 4D, and 4E are respectively attached onto the interconnecting pipes L11, L12, L13, L14, and L15. The temperature sensors 4A, 4B, 4C, 4D, and 4E respectively detect temperatures of the refrigerant in the interconnecting pipes L11, L12, L13, L14, and L15 and output signals indicating the temperatures to the controller 16.

The other end of each of the indoor heat exchangers 21A, 21B, 21C, 21D, and 21E is connected to one end of each of the expansion valves 14A, 14B, 14C, 14D, and 14E through an interconnecting pipe L21, L22, L23, L24, or L25. That is, the interconnecting pipes L21, L22, L23, L24, and L25 guide the refrigerant between the expansion valves 14A, 14B, 14C, 14D, and 14E and the indoor heat exchangers 21A, 21B, 21C, 21D, and 21E, respectively.

Temperature sensors 41A, 41B, 41C, 41D, and 41E are respectively attached onto parts of the interconnecting pipes L21, L22, L23, L24, and L25 that are adjacent to the expansion valves 14A, 14B, 14C, 14D, and 14E. The temperature sensors 41A, 41B, 41C, 41D, and 41E respectively output to the controller 16 signals indicating temperatures of the refrigerant in the interconnecting pipes L21, L22, L23, L24, and L25.

The other end of each of the expansion valves 14A, 14B, 14C, 14D, and 14E is connected through the receiver 15 to the other end of the outdoor heat exchanger 13.

The receiver 15 is detachably provided in the refrigerant circuit 3 so that the refrigerant flows through the receiver 15 in a cooling operation and a heating operation. The receiver 15 is provided in the outdoor unit so as not to be exposed to outside. The cooling operation and the heating operation are examples of the refrigeration cycle operation.

The controller 16 is made of microcomputers, input/output circuits, and the like and controls the compressor 11, the four-way switching valve 12, the expansion valves 14A, 14B, 14C, 14D, and 14E, and the like. For instance, the controller 16 controls a position of a valving element (not illustrated) in the four-way switching valve 12 so that the refrigerant in the four-way switching valve 12 flows along solid lines in the cooling operation or so that the refrigerant in the four-way switching valve 12 flows along dashed lines in the heating operation.

In FIG. 1, an arrow of solid line designates a direction in which the refrigerant in the refrigerant circuit 3 flows in the cooling operation and an arrow of dashed line designates a direction in which the refrigerant in the refrigerant circuit 3 flows in the heating operation.

Figure 2:
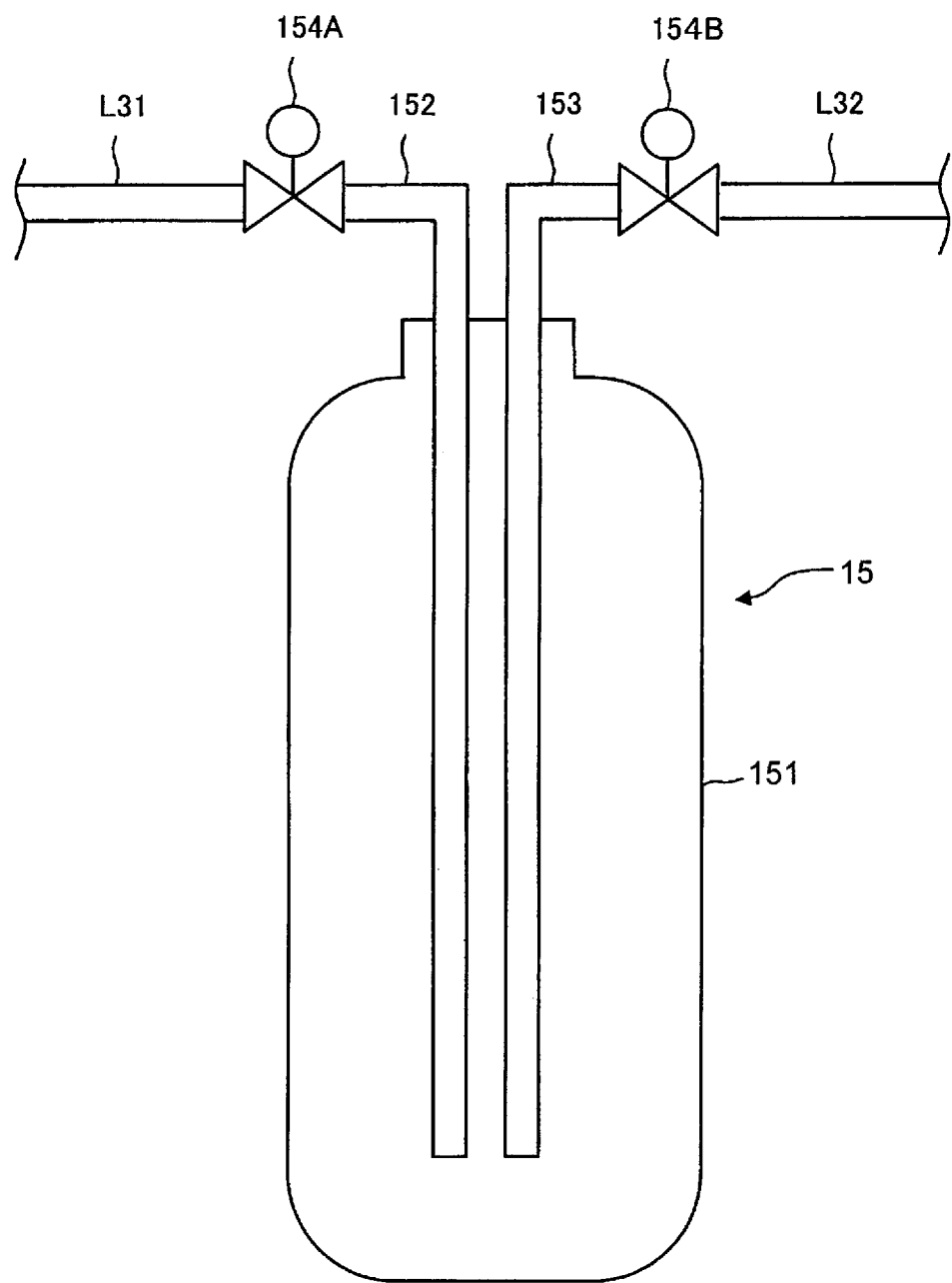
FIG. 2 is a configuration of a receiver in the multiple-type air conditioning machine.

FIG. 2 is a diagram illustrating a configuration of the receiver 15.

The receiver 15 includes a receiver body 151 that is formed of metal, for instance, and that retains the refrigerant, an outdoor-heat-exchanger side connecting pipe 152, an expansion-valve side connecting pipe 153, and first and second stop valves 154A and 154B. The receiver body 151 is an example of the container body.

One end of the outdoor-heat-exchanger side connecting pipe 152 is placed in the receiver body 151. The other end of the outdoor-heat-exchanger side connecting pipe 152 is placed out of the receiver body 151 and is connected to one end of the first stop valve 154A.

One end of the expansion-valve side connecting pipe 153 is placed in the receiver body 151 and on generally the same level as the one end of the outdoor-heat-exchanger side connecting pipe 152. The other end of the expansion-valve side connecting pipe 153 is placed out of the receiver body 151 and is connected to one end of the second stop valve 154B.

The other end of the first stop valve 154A is connected through a pipe L31 to the other end of the outdoor heat exchanger 13. Bolts (not illustrated) and nuts (not illustrated) are used for connection between the first stop valve 154A and the pipe L31 so that the first stop valve 154A can be separated from the pipe L31 by loosening of the bolts and the nuts. That is, the connection between the first stop valve 154A and the pipe L31 is flange connection.

The other end of the second stop valve 154B is connected through a pipe L32 to the other end of each of the expansion valves 14A, 14B, 14C, 14D, and 14E. Bolts (not illustrated) and nuts (not illustrated) are used for connection between the second stop valve 154B and the pipe L32 so that the second stop valve 154B can be separated from the pipe L32 by loosening of the bolts and the nuts. That is, the connection between the second stop valve 154B and the pipe L32 is the flange connection.

In FIG. 1, illustration of the first and second stop valves 154A and 154B is omitted.

Figure 3:
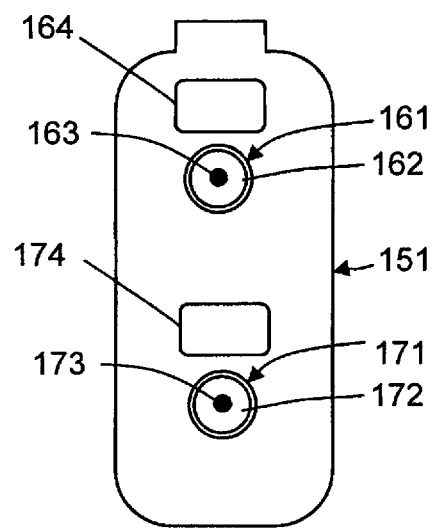
FIG. 3 is a side view of a receiver body of the receiver.

FIG. 3 is a side view of the receiver body 151.

Figure 4:
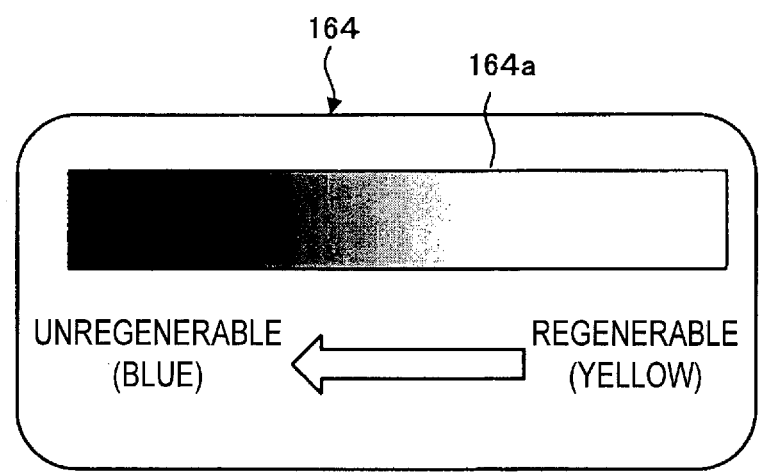
FIG. 4 is a diagram illustrating a surface of a first nameplate on the receiver body.
Figure 5:
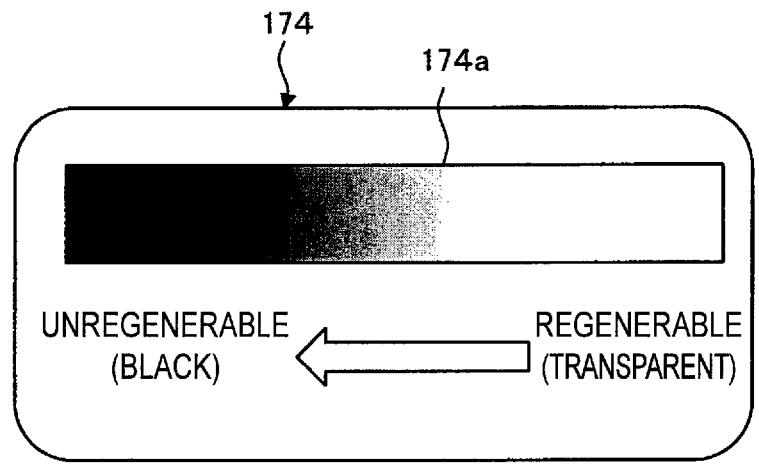
FIG. 5 is a diagram illustrating a surface of a second nameplate on the receiver body.

A side part of the receiver body 151 is provided with first and second window parts 161 and 171 that are for determination of a degree of deterioration of the refrigerant retained in the receiver body 151 and first and second nameplates 164 and 174 that display criteria for determining whether the refrigerant is suitable for regeneration or not. The first and second nameplates 164 and 174 are respectively placed adjacent to the first and second window parts 161 and 171. As illustrated in FIGS. 4 and 5, color charts 164a and 174a that serve as the criteria are provided on surfaces of the first and second nameplates 164 and 174. The first and second window parts 161 and 171 are an example of a deterioration determination unit. The first and second nameplates 164 and 174 are an example of the determination criteria display unit.

The first window part 161 indicates a degree of contamination by water as an example of a foreign substance in the refrigerant retained in the receiver body 151. As illustrated in FIG. 3, more specifically, the first window part 161 is formed above a center of the receiver body 151 heightwise and includes a windowpane 162 through which inside of the receiver body 151 is visible from an operator. A chemical substance (such as cobalt) 163 of which a color changes in accordance with an amount of water with which the refrigerant is contaminated is applied on a center part of an inner surface of the windowpane 162. The operator is capable of determining whether the refrigerant is suitable for the regeneration or not, by comparing the color of the chemical substance 163 with colors on the color chart 164a (illustrated in FIG. 4) on the first nameplate 164. In the color chart 164a, one end part above characters "REGENERABLE" assumes a yellow color and the other end part above characters "UNREGENERABLE" assumes a blue color. Colors of parts between the one end part and the other end part gradually change from yellow to blue with approach from the one end part to the other end part. Characters and an arrow below the color chart 164a mean that approach of the color of the chemical substance 163 from yellow to blue represents increase in a mix rate of water in the refrigerant and in deterioration of the refrigerant.

The second window part 171 indicates a degree of oxidation of the refrigerant retained in the receiver body 151. More specifically, the second window part 171 is formed below the center of the receiver body 151 heightwise and includes a windowpane 172 through which the inside of the receiver body 151 is visible from the operator. A dye 173, such as pH indicator, of which a color changes in accordance with the degree of oxidation of the refrigerant is applied on a center part of an inner surface of the windowpane 172. The operator is capable of determining whether the refrigerant is suitable for the regeneration or not, by comparing the color of the dye 173 with colors on the color chart 174a (illustrated in FIG. 5) on the second nameplate 174. In the color chart 174a, one end part above characters "REGENERABLE" assumes a transparent color and the other end part above characters "UNREGENERABLE" assumes a black color. Colors of parts between the one end part and the other end part gradually change from the transparent color to the black color with approach from the one end part to the other end part. Characters and an arrow below the color chart 174a mean that approach of the color of the dye 173 from the transparent color to the black color represents increase in a rate of oxidation of the refrigerant and in the deterioration of the refrigerant.

An inner surface of the receiver body 151 is colored white, for instance, in order that checking of changes in the colors of the chemical substance 163 and the dye 173 may be facilitated.

In FIG. 3, the chemical substance 163 and the dye 173 are covered with black in order that discrimination from other parts may be facilitated.

According to an above configuration, when the refrigerant is collected from the refrigerant circuit 3, the expansion valves 14A, 14B, 14C, 14D, and 14E are closed and the compressor 11 is driven. Subsequently, the refrigerant in the refrigerant circuit 3 can be gathered into the receiver 15 by closure of the first and second stop valves 154A and 154B after a lapse of a specified period of time from driving of the compressor 11. Thus the operator is capable of detaching the receiver 15 from the refrigerant circuit 3 by cancelling the connection between the pipes L31, L32 and the first and second stop valves 154A, 154B. As a result, the operator can avoid bringing a refrigerant collection cylinder having a weight exceeding 20 kg, for instance, to a place where the refrigerant circuit 3 is installed.

Though air and the like remaining in the bringing refrigerant collection cylinder might need to be discharged by vacuuming of the refrigerant collection cylinder before collection of the refrigerant into the bringing refrigerant collection cylinder, necessity of such a vacuuming operation is additionally removed in the receiver 15.

Thus a load of an operation for collecting the refrigerant can be greatly reduced in comparison with a technique in which the refrigerant is collected by the refrigerant collection cylinder.

Because of provision of the receiver 15 in the outdoor unit 1, deterioration in appearance can be avoided and the receiver 15 can be protected from impact from outside.

Use of the flattened tubes 131 as the heat transfer tubes in the outdoor heat exchanger 13 makes a capacity of the outdoor heat exchanger 13 equal to or smaller than a capacity of each of the indoor heat exchangers 21A, 21B, 21C, 21D, and 21E and thus allows the outdoor heat exchanger 13 to be reduced in size. As a result, a vacant space in the outdoor unit 1 can be increased. Accordingly, the receiver 15 can be increased in size without increase in a size of the outdoor unit 1.

The refrigerant circuit 3 is filled with all the greater amount of refrigerant for existence of the indoor units 2A, 2B, 2C, 2D, and 2E. Therefore, a significant benefit can be gained by collection of the refrigerant.

Even though the receiver 15 is detached from the refrigerant circuit 3, additionally, the refrigerant can be easily and reliably prevented from leaking out of the receiver body 151, by the first and second stop valves 154A and 154B.

Furthermore, the refrigerant is collected by the receiver 15 provided in the refrigerant circuit 3 and thus increase in costs of manufacture can be curbed.

With the first and second window parts 161 and 171 provided on the receiver body 151, the degree of deterioration of the refrigerant retained in the receiver body 151 can be easily determined at a place where the receiver 15 is installed. Accordingly, it is needless to go to a place that is remote from the place where the receiver 15 is installed, in order to determine the degree of deterioration of the refrigerant and thus troubles that are involved with the determination can be reduced.

By viewing of the first and second window parts 161 and 171, the mix rate of water in the refrigerant and the rate of oxidation of the refrigerant can be reliably grasped.

The second window part 171 is provided on a lower part of the receiver body 151 and thus the refrigerant can be brought into contact with the dye 173 with a high probability. When the rate of oxidation of the refrigerant is determined based on the dye 173, accordingly, reliability of the determination can be increased.

Whether the refrigerant is suitable for the regeneration or not can be easily determined by comparison of the colors of the chemical substance 163 and the dye 173 with the colors on the color charts 164a and 174a on the first and second nameplates 164 and 174.

Though application of the invention to the multiple-type air conditioning machine has been described for the first embodiment, the invention may be applied to a pair-type air conditioning machine, for instance.

Though the receiver 15 is used as the example of the refrigerant collection container in the first embodiment, an accumulator may be used as an example of the refrigerant collection container. In such a configuration, the accumulator as the example of the refrigerant collection container may be provided between the other end of the four-way switching valve 12 and the accumulator 112, for instance.

Though the receiver 15 is used as the example of the refrigerant collection container in the first embodiment, a cylinder may be used as an example of the refrigerant collection container.

Though the outdoor heat exchanger 13 in which the flattened tubes 131 are used as the heat transfer tubes is used in the first embodiment, an outdoor heat exchanger in which right circular tubes are used as the heat transfer tubes, for instance, may be used.

Though the connection between the first stop valve 154A and the pipe L31 is the flange connection in the first embodiment, another type of connection (such as screwed connection) may be used.

Though the connection between the second stop valve 154B and the pipe L32 is the flange connection in the first embodiment, another type of connection (such as screwed connection) may be used.

Though the first and second window parts 161 and 171 are provided on the side part of the receiver body 151 in the first embodiment, the window parts 161 and 171 may be provided on a part (such as top part or bottom part) other than the side part of the receiver body 151.

Though the chemical substance 163 is applied onto the inner surface of the windowpane 162 in the first embodiment, the dye 173 may be applied in place of the chemical substance 163.

Though the dye 173 is applied onto the inner surface of the windowpane 172 in the first embodiment, the chemical substance 163 may be applied in place of the dye 173.

Though the chemical substance 163 and the dye 173 are respectively applied onto the inner surfaces of the windowpanes 162 and 172 in the first embodiment, a transparent magnetic thin film may be applied onto the inner surface of the windowpane 162 or 172. In such a configuration, a degree of contamination by metallic powder as an example of the foreign substance in the refrigerant can be found based on change in a color of the magnetic thin film. Specifically, the greater an amount of the metallic powder with which the refrigerant is contaminated is, the closer to black the color of the magnetic thin film is. The closer to black the color of the magnetic thin film is, the severer the deterioration of the refrigerant may be considered.

Alternatively, the side part of the receiver body 151 may be provided with the first and second window parts 161 and 171 and a window part including a windowpane on which the magnetic thin film is applied onto an inner surface thereof.

Though the receiver 15 is provided in the outdoor unit 1 in the first embodiment, the receiver 15 may be provided out of the outdoor unit 1. In such a configuration, operations for detaching and attaching the receiver 15 are facilitated.

In the first embodiment, a cross fin type heat exchanger may be used in place of the outdoor heat exchanger 13. A diameter of refrigerant pipes in the cross fin type heat exchanger may be 5 mm, for instance.

Second Embodiment

Figure 6:
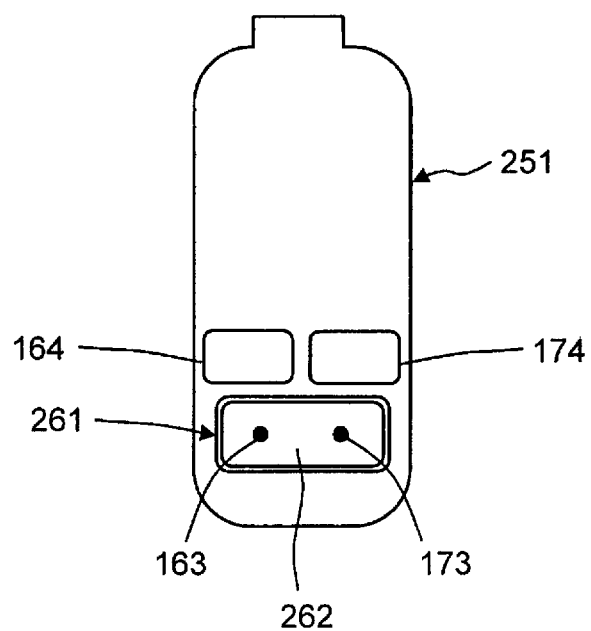
FIG. 6 is a side view of a receiver body in accordance with a second embodiment of the invention.

FIG. 6 is a side view of a receiver body 251 in accordance with a second embodiment of the invention. Components in FIG. 6 that are the same as components in FIG. 3 are provided with the same reference numerals as those for the components in FIG. 3.

A side part of the receiver body 251 is provided with a window part 261 that is for determination of a degree of deterioration of a refrigerant retained in the receiver body 251. The receiver body 251 is an example of the container body. The window part 261 is an example of the deterioration determination unit.

The window part 261 indicates a degree of contamination by water as an example of the foreign substance in the refrigerant retained in the receiver body 251 and indicates a degree of oxidation of the refrigerant retained in the receiver body 251. More specifically, the window part 261 is formed on a lower part of the receiver body 251 heightwise and includes a windowpane 262 through which inside of the receiver body 251 is visible from the operator. On an inner surface of the windowpane 262, the chemical substance 163 and the dye 173 are applied so as to adjoin. On condition that a height of the receiver body 251 is expressed as H, the lower part of the receiver body 251 preferably extends by H/3 from a bottom end of the receiver body 251 toward an upper end of the receiver body 251 and more preferably extends by H/4 from the bottom end of the receiver body 251 toward the upper end of the receiver body 251.

An inner surface of the receiver body 251 is colored white, for instance, in order that checking of changes in the colors of the chemical substance 163 and the dye 173 may be facilitated.

Third Embodiment

Figure 7:
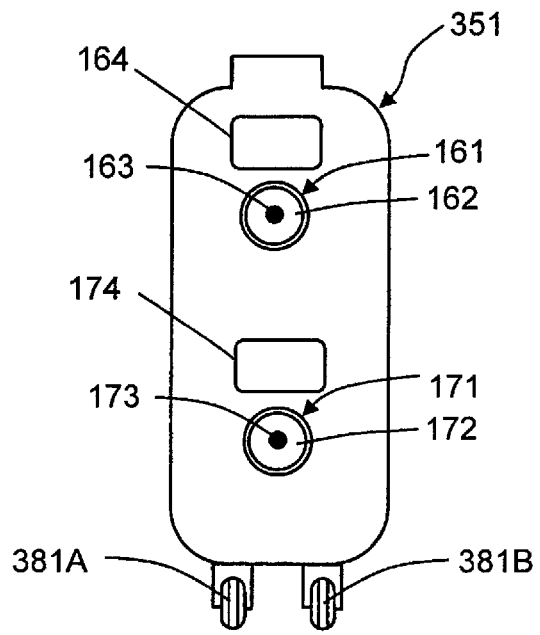
FIG. 7 is a side view of a receiver body in accordance with a third embodiment of the invention.

FIG. 7 is a side view of a receiver body 351 in accordance with a third embodiment of the invention. Components in FIG. 7 that are the same as the components in FIG. 3 are provided with the same reference characters as those for the components in FIG. 3.

Four wheels 381A, 381B (only two wheels are illustrated in FIG. 7) are mounted on a lower part of the receiver body 351, for instance. Thus the receiver body 351 can be easily moved after the refrigerant is collected and the load of the operation for collecting the refrigerant is consequently lighter than in the first and second embodiments.

Though a number of the wheels mounted on the lower part of the receiver body 351 is four in the third embodiment, the number may be one, two, three, five or more.

Fourth Embodiment

Figure 8:
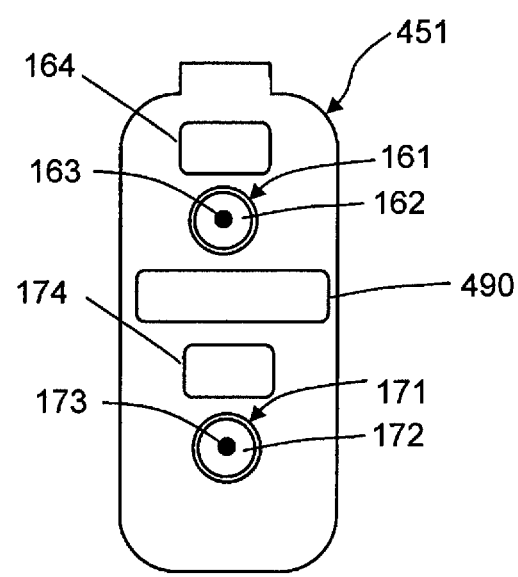
FIG. 8 is a side view of a receiver body in accordance with a fourth embodiment of the invention.

FIG. 8 is a side view of a receiver body 451 in accordance with a fourth embodiment of the invention. Components in FIG. 8 that are the same as the components in FIG. 3 are provided with the same reference numerals as those for the components in FIG. 3.

A side part of the receiver body 451 is provided with a nameplate 490 as an example of a regeneration information display unit. Once a refrigerant is collected into the receiver body 451, regenerated, and filled into the receiver body 451, a date of regeneration of the refrigerant, a name of a company that has regenerated the refrigerant, specified substances (such as amine substances) that have been removed from the refrigerant before the regeneration, and the like are inscribed on the nameplate 490. Thus it is made possible for a user to easily grasp such information as described above and related to the regeneration of the refrigerant by viewing the nameplate 490.

Besides, timing of the subsequent regeneration of the refrigerant can be easily estimated because the date when the refrigerant has been regenerated has been inscribed on the nameplate 490.

Additionally, credit quality of the company that has regenerated the refrigerant can be made to appeal to the user because the name of the company has been inscribed on the nameplate 490.

Though the specific embodiments of the invention have been described, the invention is not limited to the embodiments and can be embodied with modification in various ways within the scope of the invention. For instance, an appropriate combination of some of contents described for the first through fourth embodiments may be made into an embodiment of the invention.

REFERENCE SIGNS LIST 1 outdoor unit
2A, 2B, 2C, 2D, 2E indoor unit
3 refrigerant circuit
11 compressor
12 four-way switching valve
13 outdoor heat exchanger
14A, 14B, 14C, 14D, 14E expansion valve
15 receiver
16 controller
21A, 21B, 21C, 21D, 21E indoor heat exchanger
131 flattened tube
132 corrugated fin
133A first header
133B second header
134 first opening
135 second opening
151 receiver body
154A first stop valve
154B second stop valve
151, 251, 351, 451 receiver body
161 first window part
162, 172 windowpane
163 chemical substance
164 first nameplate
164a color chart
171 second window part
172 windowpane
173 dye
174 second nameplate
174a color chart
261 window part
381A, 381B wheel
490 nameplate

The invention claimed is:

1. A refrigerating device comprising:
a refrigerant circuit through which a refrigerant flows, and
a refrigerant collection container detachably provided in the refrigerant circuit such that the refrigerant flows through the refrigerant collection container in a refrigeration cycle operation,
the refrigerant circuit including a compressor, an outdoor heat exchanger, an expansion valve, an indoor heat exchanger, which are connected such that the refrigerant flows from the compressor, to the outdoor heat exchanger, to the expansion valve, to the indoor heat exchanger, and back to the compressor during a cooling operation of the refrigerating device,
the refrigerant collection container being provided between the outdoor heat exchanger and the expansion valve such that the expansion valve is located between the indoor heat exchanger and the refrigerant collection container, with no expansion valve being provided between the outdoor heat exchanger and the refrigerant collection container,
the refrigerant collection container including an outdoor-heat-exchanger side connecting pipe, an expansion-valve side connecting pipe, and a container body that retains the refrigerant;
the outdoor-heat-exchanger side connecting pipe being detachably connected to a first pipe connected to the outdoor heat exchanger, while the expansion-valve side connecting pipe being detachably connected to a second pipe connected to the expansion valve, with the first pipe and the second pipe being fluidly connected to each other via the outdoor-heat-exchanger side connecting pipe and the expansion-valve side connecting pipe of the refrigerant collection container, but via no other pipes;
the refrigerant collection container including a refrigerant deterioration determination unit, wherein the refrigerant deterioration determination unit includes a windowpane provided in the container body, the windowpane having an inner surface applied with one of a chemical substance, a dye, or a magnetic film, whose color change indicates a degree of deterioration of the refrigerant.

2. The refrigerating device as claimed in claim 1, wherein the refrigerant collection container is a receiver.

3. The refrigerating device as claimed in claim 1, wherein the windowpane inner surface is applied with the chemical substance and the chemical substance color change indicates a degree of contamination of the refrigerant as the degree of deterioration of the refrigerant.

4. The refrigerating device as claimed in claim 1, wherein the windowpane inner surface is applied with the dye and the dye color change indicates a degree of oxidation of the refrigerant as the degree of deterioration of the refrigerant.

5. The refrigerating device as claimed in claim 1, wherein the windowpane inner surface is applied with the magnetic film and the magnetic film color change indicates a degree of contamination by metallic powder in the refrigerant as the degree of deterioration of the refrigerant.

6. The refrigerating device as claimed in claim 1, wherein the refrigerant deterioration determination unit includes at least two windowpanes each having an inner surface applied with a respective one of the chemical substance, dye, or magnetic film.

7. The refrigerating device as claimed in claim 1, wherein the refrigerant collection container further comprises first and second stop valves connected to the outdoor-heatexchanger side connecting pipe and the expansion-valve side connecting pipe, respectively the first stop valve is separably connected to the first pipe, and the second stop valve is separably connected to the second pipe.

8. The refrigerating device as claimed in claim 7, wherein the refrigerant collection container is a receiver.

9. The refrigerating device as claimed in claim 1, further comprising an outdoor unit including the outdoor heat exchanger provided in the refrigerant circuit, wherein the refrigerant collection container is provided in the outdoor unit.

10. The refrigerating device as claimed in claim 9, wherein the refrigerant collection container is a receiver.

11. The refrigerating device as claimed in claim 9, wherein the refrigerant collection container further comprises first and second stop valves connected to the outdoor-heat-exchanger side connecting pipe and the expansion-valve side connecting pipe, respectively the first stop valve is separably connected to the first pipe, and the second stop valve is separably connected to the second pipe.

12. The refrigerating device as claimed in claim 1, further comprising a plurality of indoor units, each indoor unit including an indoor heat exchanger provided in the refrigerant circuit.

13. The refrigerating device as claimed in claim 12, wherein the refrigerant collection container is a receiver.

14. The refrigerating device as claimed in claim 12, wherein the refrigerant collection container further comprises first and second stop valves connected to the outdoor-heat-exchanger side connecting pipe and the expansion-valve side connecting pipe, respectively the first stop valve is separably connected to the first pipe, and the second stop valve is separably connected to the second pipe.

15. A refrigerating device comprising:

a refrigerant circuit through which a refrigerant flows, and a refrigerant collection container detachably provided in the refrigerant circuit such that the refrigerant flows through the refrigerant collection container in a refrigeration cycle operation, the refrigerant circuit including a compressor, an outdoor heat exchanger, an expansion valve, an indoor heat exchanger, which are connected such that the refrigerant flows from the compressor, to the outdoor heat exchanger, to the expansion valve, to the indoor heat exchanger, and back to the compressor during a cooling operation of the refrigerating device, the refrigerant collection container being provided between the outdoor heat exchanger and the expansion valve such that the expansion valve is located between the indoor heat exchanger and the refrigerant collection container, with no expansion valve being provided between the outdoor heat exchanger and the refrigerant collection container, the refrigerant collection container including an outdoor-heat-exchanger side connecting pipe, an expansion-valve side connecting pipe, and a container body that retains the refrigerant, the outdoor-heat-exchanger side connecting pipe being detachably connected to a first pipe connected to the outdoor heat exchanger, while the expansion-valve side connecting pipe being detachably connected to a second pipe connected to the expansion valve, with the first pipe and the second pipe being fluidly connected to each other via the outdoor-heat-exchanger side connecting pipe and the expansion-valve side connecting pipe of the refrigerant collection container, but via no other pipes, the refrigerant collection container including a refrigerant deterioration determination unit, wherein the refrigerant deterioration determination unit includes a windowpane provided in the container body, the windowpane having an inner surface applied with two or more of a chemical substance, a dye, and a magnetic film, whose color change indicates a degree of deterioration of the refrigerant.

16. The refrigerating device as claimed in claim 15, wherein the inner surface of the windowpane is applied with at least the chemical substance and the dye.

* * * * *